Aug. 9, 1949.  J. J. DE MUTH  2,478,750
VACUUM TUBE COMPARISON TEST METHOD AND SYSTEM
Filed April 17, 1948   2 Sheets-Sheet 2
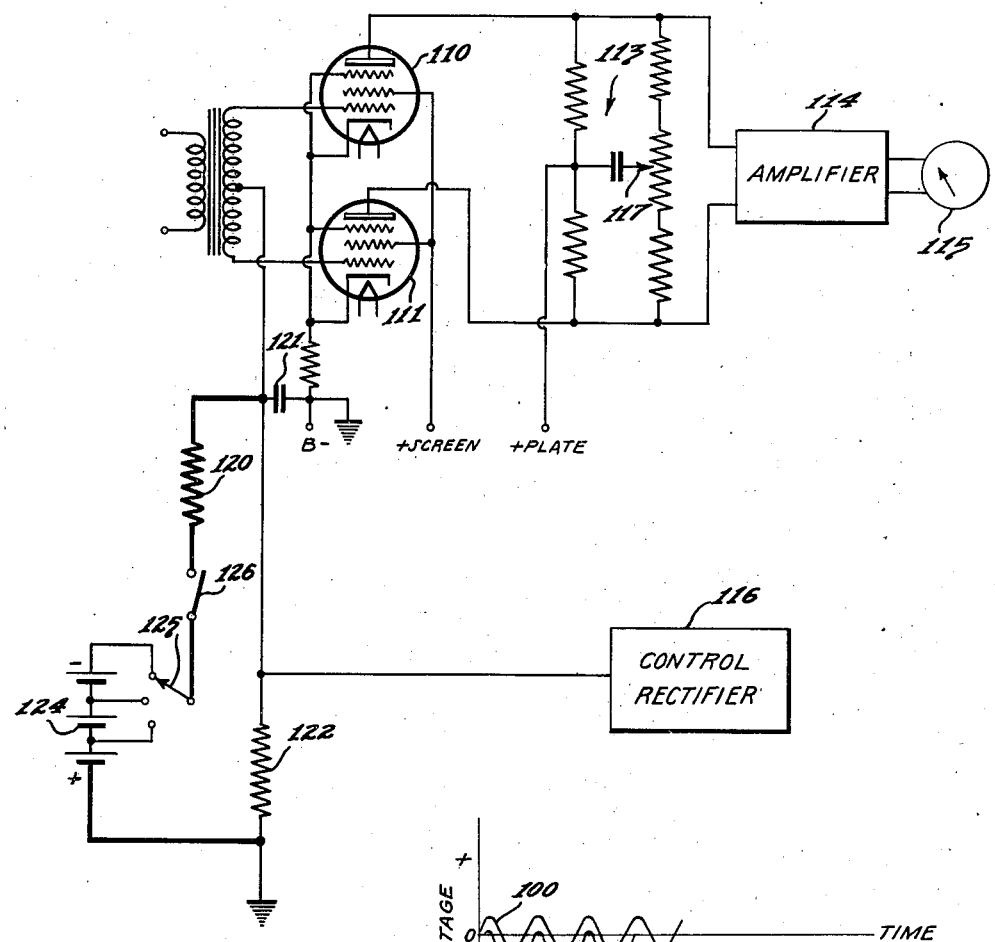
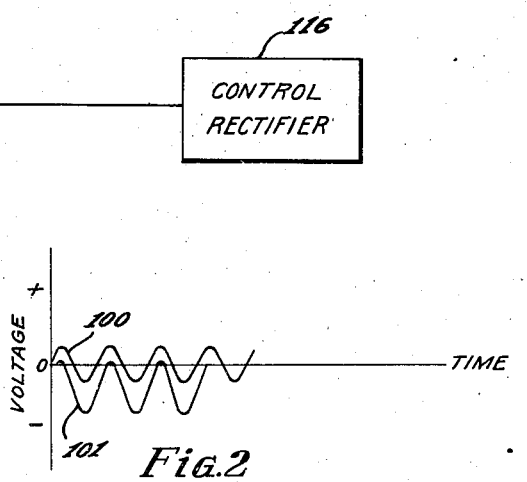
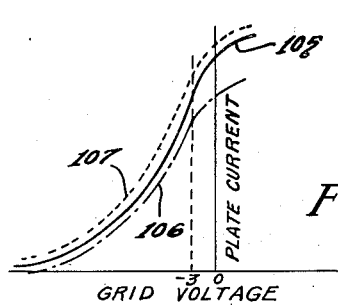
INVENTOR.
JOHN J. DE MUTH
BY
ATTORNEY.

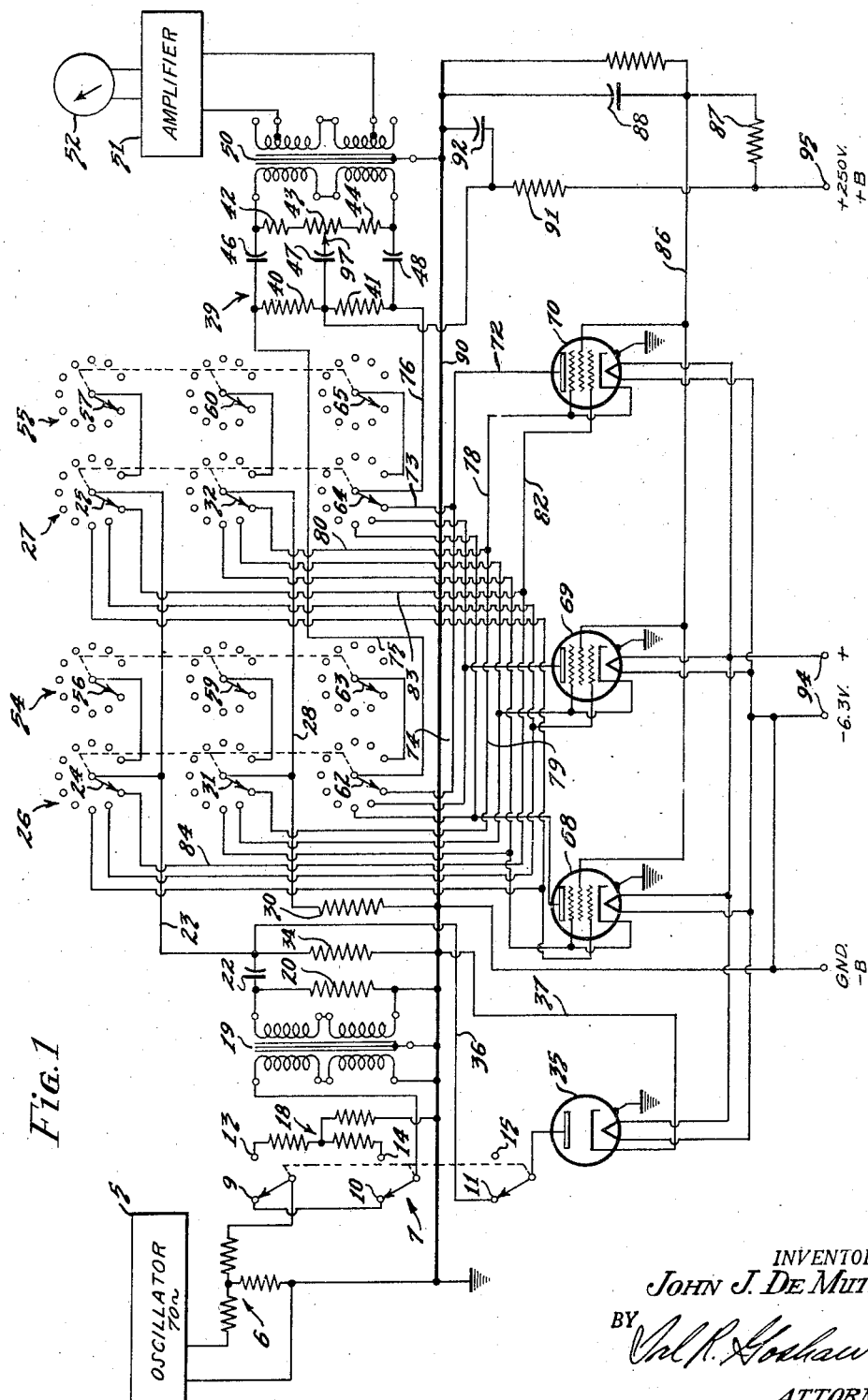

Patented Aug. 9, 1949

2,478,750

UNITED STATES PATENT OFFICE 2,478,750

VACUUM TUBE COMPARISON TEST METHOD AND SYSTEM

John J. De Muth, Burbank, Calif., assignor to Radio Corporation of America, a corporation of Delaware Application April 17, 1948, Serial No. 21,697

15 Claims. (Cl. 315—370)

This invention relates to electrical circuits, and particularly to a test circuit for selecting pairs of electron vacuum tubes having substantially identical or parallel characteristics.

In systems using variable gain amplifiers, and particularly in compression, expander, and volume control circuits, wherein either an independent signal or the signal being amplified controls the amplifier gain, and thus, the volume level of the signal being transmitted, the control is usually obtained by varying the grid bias on a pair of variable mu tubes connected in push-pull. The pair of tubes operating in the variable gain stage should have characteristics as nearly identical or parallel as possible to prevent the introduction of spurious currents during the variations in gain of the tubes. That is, should one tube not produce the same variation in output current as the other for the same grid variation, then a differential current is introduced, which is commonly known as a "thump." The matching of the push-pull tubes and the balancing of the push-pull circuit eliminates the spurious currents. A variable gain circuit of the above type is disclosed and claimed in Singer U. S. Patent No. 2,255,683 of September 9, 1941.

Several systems for determining the static and dynamic balance of a push-pull circuit and the tubes used therein have been suggested, such as disclosed and claimed in Bayless U. S. Patent No. 2,385,186 of September 18, 1945, this circuit being one to determine the dynamic balance of the tubes and circuits. Other systems for determining the similarity of the characteristics of push-pull tubes at one or more settings of the grid bias are shown in Lavoie U. S. Patent No. 1,948,303 of February 20, 1934, and Miessner U. S. Patent No. 1,946,092 of February 6, 1934. The systems shown in the above patents are ones wherein the actual system in which the tubes are to be used may be tested with the tubes in the circuit. The present invention, however, is directed primarily to a system whereby pairs of matching tubes may be selected from a group of tubes, these pairs then being suitable for use in a system such as shown in the above mentioned Singer circuit.

The invention provides a rapid method of selecting and determining the dynamic characteristics over a wide range of negative grid bias, and also provides a static test over a short section of the grid voltage-plate current characteristics. The invention also includes a circuit for making a quick field test of a pair of tubes when inserted in a circuit in which they are to be used, in the event that one or the other has drifted since they were selected as a matched pair. This latter circuit also permits the balance control of the amplifier to be adjusted to an optimum position for dynamic operation. A clamping circuit is embodied in the main testing system whereby only negative voltages may be derived from a normal alternating current. The multiple section switches connect the input of each tube in parallel with every other tube and the outputs of each selected pair of tubes in push-pull. Thus, the variations in transmission characteristics are quickly indicated.

The principal object of the invention, therefore, is to facilitate the matching of electron vacuum tubes.

Another object of the invention is to provide an improved method of and system for determining vacuum tubes having identical or parallel characteristics from among a plurality of such tubes.

A further object of the invention is to provide an improved test system for obtaining matched pairs of electron vacuum tubes.

A still further object of the invention is to provide an improved test method and system for selecting electron tube pairs having similar or parallel characteristics.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a schematic circuit of a test system embodying the invention.

Fig. 2 is a graph showing the operation of the clamp circuit of the test system of Fig. 1.

Fig. 3 is a graph showing several tube characteristics, and

Fig. 4 is a schematic circuit drawing of a field test system.

Referring now to the drawings, and particularly referring to Fig. 1, an oscillator 5, which may be tuned to provide an output current having a frequency in the neighborhood of seventy cycles, is connected through a T-pad 6 to a gang switch 7 having left-hand contacts 9, 10, and 11 and right-hand contacts 13, 14, and 15. The next element in the system is a three-resistor attenuator pad 18 which is connected in the circuit when the switch 7 is thrown to the right, and is eliminated from the circuit when the switch 7 is thrown to the left.

The output of oscillator 5 is impressed on a transformer 19, the secondary of which has a terminating resistor 20 connected across it, and which is then capacity coupled over a condenser 22 and conductor 23 to the swingers 24 and 25 of the first or upper sections of gang switch units 26 and 27, respectively. The other terminal of the secondary of transformer 19 is connected, over a cathode resistor 30 having a value comparable to that used in the usual commercial variable gain amplifier and conductor 28 to the swingers 31 and 32 of the second or middle sections of switch units 26 and 27. A resistor 34 is in shunt across the secondary of transformer 19 and simulates the timing resistor of a normal variable gain amplifier. This resistor is also one of the elements of the clamp circuit including the condenser 22 and a diode tube 35 connected in shunt across the secondary circuit over conductors 36 and 37 when the switch 7 is thrown to contact 11.

The right-hand portion of the circuit includes a balancing resistor and condenser network 39 composed of resistors 40, 41, 42, 43, and 44, together with a condenser 47, condensers 46 and 48 being blocking condensers. The output of this network is impressed on a transformer 50, the secondary of which is connected to an amplifier 51 feeding a meter 52, the latter being any standard volume indicator.

The present circuit has been designed to compare twenty-one tubes by the use of switch units 26 and 27 operating in conjunction with multiplier switch units 54 and 55. This is accomplished by connecting swinger 24 of unit 26 to a swinger 56 of unit 54 when the former is moved to its last contact, and by connecting swinger 25 of unit 27 to a swinger 57 of unit 55 when swinger 25 is moved to its last contact. The same connections are made for the second sections of the switch units, that is, swinger 31 is connected with swinger 59, and swinger 32 is connected with swinger 60. Each switch unit 26, 27, 54, and 55 also has a third or lower section ganged with the first and second sections, as indicated by the broken lines, a swinger 62 of the third section of unit 26 connecting with swinger 63 when swinger 62 is on its last contact, and swinger 64 connecting with swinger 65 when swinger 64 is on its last contact. As mentioned above, the first two sections of the ganged switch units transfer the output of transformer 19 to selected tubes in parallel, while the third sections of the respective units transfer the output of the tubes to network 39 in push-pull.

For purposes of illustration, only three tubes 68, 69, and 70 are shown under test for the sake of clarity of explanation, it being understood that the other eighteen tubes are connected to the eleven contacts of switch units 54 and 55 in a similar manner and to the remaining seven contacts of the switch units 26 and 27 in a similar manner. Thus, the tubes connected to the eleven contacts of units 54 and 55 are connectable into the system when the swingers of units 26 and 27 are on their last contacts.

To trace out the circuit for connecting tubes 68, 69, and 70 into the system, it will be noted that the anode of tube 70 is connected over conductors 72, 73, and 74 to the first contacts of the third sections of switch units 26 and 27. Swinger 62 is now connected to one terminal of network 39 over conductor 75, and swinger 64 is connected to the other terminal of network 39. Thus, the anode of tube 70 may be connected to either terminal of the output push-pull network, depending upon the terminal to which the tube with which it is being compared is connected. Likewise, the anode of tube 69 may be connected to either terminal of the network over the second contacts of the third section of switch units 26 and 27, while the anode of tube 68 is similarly wired over the third contacts of these switches. Thus, with swinger 64 on its first contact, and swinger 62 on its second contact, the outputs of tube 69 and tube 70 are connected in push-pull to the network 39 and any difference in these outputs will be indicated on meter 52. If the swinger 62 is thrown to its third contact position, then tube 68 will be connected in the system and its output can be compared with that of tube 70. If swinger 64 is swung to its second contact, and swinger 62 to its third contact, then the outputs of tubes 68 and 69 may be compared. Thus, the third sections of the switch units permit the outputs of any pair of tubes to be connected in push-pull to network 39.

Referring to the input connections for the tubes, it will be noted that the cathode of tube 70 is connected over conductors 78, 79, and 80 to the first contact of the second or middle sections of switch units 26 and 27, while the grid of tube 70 is connected over conductors 82, 83, and 84 to the first contact of the first or upper sections of switch units 26 and 27. Similar connections are provided to connect the grids and cathodes of tubes 69 and 68 to the second and third contacts, respectively, of the first and second sections. Now, since the three sections of the respective switch units are ganged together, then, when the anode or output of a tube is connected to one or the other of the input terminals to network 39, its input is connected across the secondary of transformer 19. Thus, the inputs of any pair of tubes selected are in parallel across transformer 19, and each tube receives the same signal input. So, if the characteristics of the tubes are identical, then there will be no reading at meter 52.

The input circuits are over swingers 24 and 25, which connect the control grid of tube 70 over conductor 23 to one terminal of the secondary of input transformer 19, and swingers 31 and 32 which connect the cathode of tube 70 over conductor 28 and resistor 30 to the other terminal of the secondary of transformer 19. These last mentioned swingers, in cooperation with swingers 56, 57, 59, and 60 of switch units 54 and 55 thus connect the grids and cathodes of each tube in parallel with transformer 19 in accordance with the setting of the swingers. In this manner, the characteristics of each of the twenty-one tubes within the capacity of the system may be compared with that of every other tube connected to the respective contacts, and a rapid comparison can thus be made.

The screen grids of each of the tubes 68, 69, and 70 and all other tubes being tested are connected over a common conductor 86 through a screen voltage divider 87 and condenser 88 to the ground conductor 90. A plate voltage resistor 91 and filter-condenser 92 are also provided. The cathode heaters may be connected to an energy source at terminals 94, while the anode voltage supply is connected at terminal 95.

To illustrate the method of making a test, a pair of tubes, such as 68 and 69, may be connected for test by throwing swingers 25, 32, and 64 to their second contacts, and swingers 24, 31, and 62 to their third contacts. Switch 7 is now thrown to the left, which is the dynamic test position for the tubes 68 and 69. The clamp circuit, including tube 35, is now connected in the circuit and the grid voltage impressed on the tubes 68 and 69 is all negative. This is accomplished by the clamp circuit in the manner shown in Fig. 2, wherein the alternating current output of the oscillator 5 is represented by the alternating current sine wave 100 having a zero potential axis and which charges condenser 22 to substantially the amplitude of wave 100 during the first positive half cycle of the wave. However, since the tube 35 shunts the output of transformer 19 in one direction only, the actual wave impressed on the input of the tubes to be tested is as shown by curve 101, wherein substantially all of the wave is below the zero axis of the wave 100, there being only a very small flat portion at the crests of wave 101 due to the discharge of condenser 22 through resistor 34. However, for all practical purposes, the entire wave 101 is negative, and its peak value is essentially the same as that of wave 100. This type of wave is desired since the gain varying voltage impressed on the tubes in the normal variable gain circuit is all in the negative direction, as shown in Fig. 3.

Continuing the method of selecting a matched pair of tubes, when the sine wave 101 is impressed on the tubes 68 and 69, any unbalance between the characteristics will be indicated on meter 52; the tube being swung over substantially its entire grid characteristic, as shown in Fig. 3. One of the criteria of the test is that the differential current, as indicated at meter 52, be below —57 dbm, and if the indication at 52 shows a higher level, then either switch units 26 or 27 should be turned to select another tube. However, before another tube is selected for comparison with either 68 or 69, the balancing slider 97 is adjusted to obtain the "null" reading at meter 52. It is this "null" reading which must be below —57 dbm.

Assuming now that a pair of tubes comes within the —57 dbm limit, then switch 7 is thrown to the right, inserting the pad 18 and eliminating the clamp circuit. This is considered a static test, as it impresses on the tubes selected by the dynamic test a voltage wave like that of 100, shown in Fig. 2, but of reduced amplitude. This wave will operate the tubes over a short portion of the characteristic at a point of zero gain reduction such as —3 volts and determine the correspondence of the two characteristics at this point. As shown in Fig. 3, assume one tube has a characteristic as shown by the solid line 105, and the other tube has a characteristic such as shown by the dot-and-dash line 106. Since these characteristics are nearly parallel over the majority of their lengths and over which voltage wave 101 swings the grids of the tubes, the differential output of the dynamic test may well be below —57 dbm. However, it is noted that the curves 105 and 106 depart from parallelism around the —3 volt grid bias point, and thus, the static test will indicate this condition. To obtain the minimum variation during this test, the potentiometer 97 is again adjusted to provide the minimum reading at meter 52. Now, if the variation between the upper portions of curve 105 and curve 106 is not too great, this adjustment may bring the output level below —83 dbm, which has been set up as the limiting value for this test. If the output is higher than —83 dbm, a new pair of tubes should be tested.

Now, if the pair of tubes is satisfactory up to this point, the next operation is to throw the switch 7 again to its left-hand position for a dynamic test reading, and without any further adjustment of the potentiometer 97, the output level then should be below —47 dbm. If this reading is above this value, then a new pair of tubes should be connected into the test circuit. A pair of tubes do not have to have identical characteristics throughout their entire range to operate satisfactorily in a variable gain circuit. That is, a tube having a characteristic such as shown by curve 107 will operate satisfactorily with a tube having a characteristic such as shown by curve 105, since potentiometer 97, used in a commercial circuit, can easily match such tubes. Furthermore, it will be noted that either the dynamic or static test alone will not provide sufficient information to enable the selection of satisfactory tube pairs, since, as pointed out, a good pair of tubes by the dynamic test may not be satisfactory under the static test and vice versa. The static test could be satisfactory if only small grid bias variations were to be applied in actual practice, but the larger negative swings are actually encountered. With both tests, however, a great many pairs of matched tubes may be quickly selected for use in commercial operating variable gain amplifiers or any push-pull amplifier where balance is desirable.

Referring now to Fig. 4, tubes 110 and 111 are shown connected in a variable gain amplifier of an operating circuit having a standard balancing network 113, output amplifier 114, and a volume indicator meter 115. Monitoring loudspeakers may also be connected into the circuit. The control rectifier 116 may be an independent source of voltage gain control, or may be the feedback from the output of the variable gain amplifier, as disclosed in the above mentioned Singer patent. The balance control potentiometer is shown at 117.

The added portion to the standard circuit is shown in the heavy lines, a resistor 120 simulating the internal impedance of the control rectifier 116 to maintain the charging rate of a condenser 121 the same as in normal operation, resistor 122 being the regular release resistor for the condenser 121. A source of direct current is indicated as a battery 124, the battery having several taps which would provide, for instance, three, six, and nine volts, depending upon the amount of gain reduction desired. A swinger 125 selects the desired value of negative voltage to be applied to the grids in parallel and the momentary closing of a switch 126 applies the voltage.

This adjunct permits of the adjusting of balancing network 113 and provides a quick check of the tubes in the field in the event one tube of the pair has shifted or changed its characteristic between the period of the test in the circuit of Fig. 1 and their actual insertion in an operating circuit. By adjustment of switch 125 to the higher negative values, a rapid dynamic test may be made, and the potentiometer 117 adjusted accordingly. This test may be made in the field at any time the amplifier is not transmitting a signal, and should the output at 115 be excessive, the tubes 110 and 111 may be discarded and a new pair placed in the circuit.

I claim:

1. A tube testing system comprising a source of current of substantially constant frequency, a plurality of plural section switches adapted to connect and disconnect the inputs and outputs of a plurality of tubes to be matched one against the other, a push-pull circuit, a current measuring device for indicating the current in said push-pull circuit, certain sections of said switches connecting in parallel, the inputs of a pair of said tubes to said constant frequency source and certain other sections connecting the outputs of said pair of tubes to said push-pull circuit, and a clamp circuit for shifting the voltage output of said constant frequency source to a negative value.

2. A tube testing system in accordance with claim 1, in which additional switch means are provided for connecting and disconnecting said clamp circuit to said constant frequency source, and an attenuator is provided, said switch means connecting said attenuator into said system when said clamp circuit is eliminated from said system.

3. A tube testing system in accordance with claim 1, in which certain sections of said switches are ganged together, certain of said sections shifting the output of said constant frequency source between different tubes and other sections shifting the output between said tubes and said push-pull circuit.

4. A tube testing system in accordance with claim 1, in which said clamp circuit includes a diode vacuum tube, a series condenser, and a shunt resistor.

5. A testing system for obtaining vacuum tubes with similar characteristics comprising a source of alternating current having a certain frequency, a clamp circuit for shifting said alternating current to a wave having substantially all negative values, switching means for switching said clamp circuit in and out of said testing system, a parallel input circuit from said clamp circuit to the inputs of a pair of tubes to be compared, a push-pull output circuit for said tubes, and means for reading the differential between the currents transmitted by said tubes, one position of said switching means providing a simultaneous grid variation for both of said tubes extending substantially over the entire negative characteristic of said tubes, and another position of said switching means providing a grid variation extending over a small limited negative portion of said characteristics of said tubes.

6. A system in accordance with claim 5, in which switching means are provided for connecting into said test system one or more of a plurality of vacuum tubes.

7. A system in accordance with claim 5, in which an attenuator is provided in said test system, said attenuator being introduced in said system when said clamp circuit is eliminated from said system.

8. The method of selecting a pair of tubes having substantially identical characteristics from among a plurality of tubes comprising simultaneously swinging the grids of a pair of said tubes over substantially the entire negative range of the characteristics of said tubes, measuring the differential current between the outputs of said tubes, said differential current having a predetermined maximum critical value, then simultaneously swinging said grids over a short portion of their characteristics, and measuring the differential current between the outputs of said tubes, said differential current having another predetermined maximum critical value.

9. The method in accordance with claim 8, in which the grids of said tubes are again simultaneously swung over substantially their entire negative range, and again determining the differential current between the outputs of said tubes, said differential current having a third predetermined maximum critical value.

10. The method of detecting unbalance between two tubes adapted to operate in a push-pull circuit comprising simultaneously varying the negative potential on said tubes over substantially the entire negative portions of their characteristics, measuring the difference between the output currents of said tubes, then simultaneously varying the negative potential on said tubes over a short portion of their characteristics near their zero grid voltage point, again measuring the difference between the output currents of said tubes, again simultaneously varying the negative potential on said tubes over substantially the entire negative portions of their characteristics, and again measuring the difference between the output currents of said tubes.

11. The method in accordance with claim 10, in which each current measurement must be below a certain predetermined value to provide a satisfactory operative pair of tubes, said last mentioned measurement having a higher value than said first mentioned measurement.

12. A tube testing circuit comprising a source of test voltage for a pair of tubes to be tested for similarity of their characteristics, a switch for connecting the inputs of said tubes to said source of voltage, a push-pull output circuit for said tubes, a current meter for measuring the difference in current output from said tubes, and connected to said push-pull circuit, means connected between said voltage source and the inputs to said tubes for shifting the input voltage to said tubes to negative values, and an attenuator connectable to said switch, said switch disconnecting said voltage shifting means and connecting said attenuator in the inputs to said tubes.

13. A tube testing circuit in accordance with claim 12, in which a plurality of triple-sectioned switches are provided, a pair of said sections connecting the inputs of each of a plurality of tubes in parallel to said first mentioned switch, and the remaining sections of said switches connecting the outputs of a pair of said plurality of tubes to said push-pull output circuit.

14. A tube testing circuit in accordance with claim 12, in which said voltage shifting means is a diode connected in shunt across the inputs to said tubes.

15. A tube testing circuit comprising a source of test voltage, means adapted to connect the inputs of a plurality of tubes to be tested in parallel to said voltage source, a push-pull output circuit adapted to be connected to the outputs of a pair of said tubes, and a pair of triple-sectioned gang switches, the inputs of each of said tubes being connected to contacts on two sections of both of said gang switches and the outputs of all of said tubes being connected to contacts on the remaining sections of said gang switches.

JOHN J. DE MUTH.

REFERENCES CITED

The following references are of record in the file of this patent:

UNITED STATES PATENTS

| Number | Name | Date |
|---|---|---|
| 1,946,092 | Miessner | Feb. 6, 1934 |
| 1,948,303 | Lavoie | Feb. 20, 1934 |
| 2,385,186 | Bayless | Sept. 18, 1945 |